Figure 1:
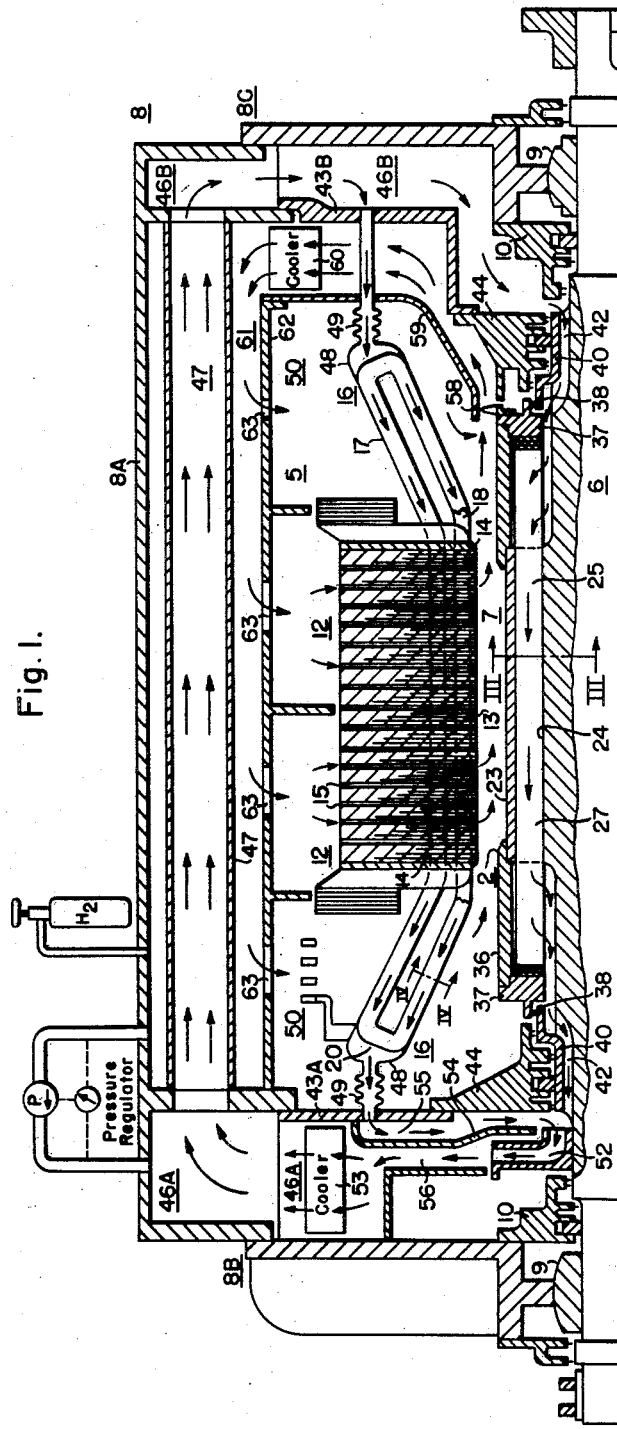

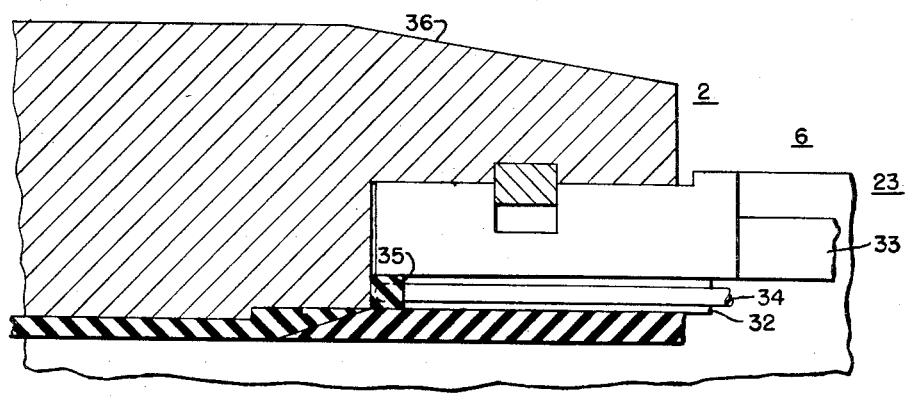
Fig. 2.
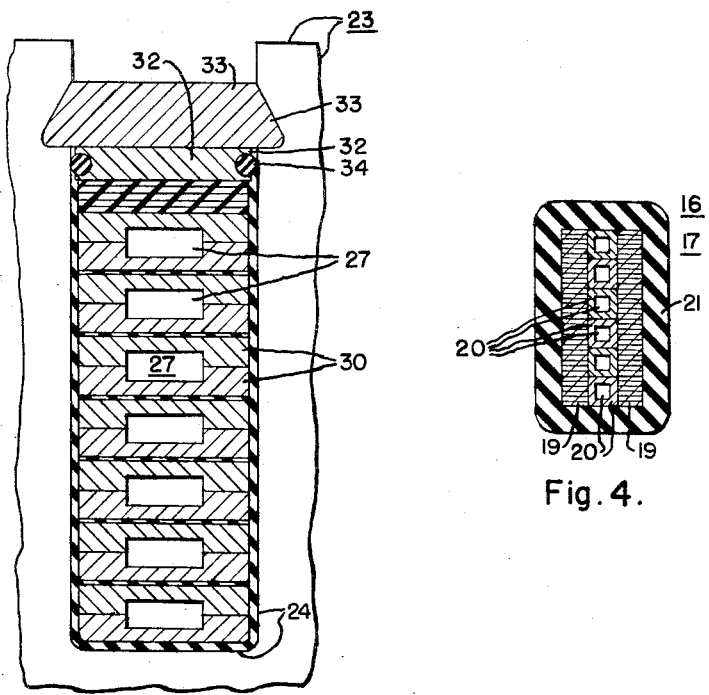
Fig. 3.
Fig. 4.

2,873,393

DUAL-VENTILATION HYDROGEN-COOLED GENERATORS

René A. Baudry, Pittsburgh, Pa., assignor to Westinghouse Electric Corporation, East Pittsburgh, Pa., a corporation of Pennsylvania Application March 28, 1957, Serial No. 649,141

8 Claims. (Cl. 310—55)

My invention relates primarily to large two-pole innercooled turbine generators or like synchronous dynamoelectric machines, using hydrogen as the cooling gas, or, in general, using a gas having a molecular weight lower than 14. More particularly, my invention relates to a dual-cooled high-speed dynamo-electric machine in which at least the stator-windings, and preferably also the rotor-windings, are innercooled as a part of a separate gas-tight cooling-system which is separate, and substantially hermetically sealed, from the rest of the gas-filled space within the machine-housing, and using the same gas which is used in the rest of the housing. Preferably, the gas is at a considerably higher pressure, in the separate gas-tight cooling-system which includes the innercooling ducts of the windings, than in the housing-space in which the rotor member rotates, thereby obtaining the superior cooling advantages which are possible with a high gaseous pressure, without the serious handicap of the high windage losses which are obtained when a high gaseous pressure is used in the part of the housing in which the rotor rotates.

By using the same gas in both of the cooling-systems of the machine, I avoid the serious risk and difficulties which have heretofore been encountered in using a liquid, or in general a dissimilar fluid, in the innercooling stator-winding ducts, different from the gas in the part of the housing-space in which the rotor member rotates, because, in my present system, any leakage through the various seals and joints of my separate gas-tight cooling-system for the innercooled windings will return to the low-pressure zone, and will not be objectionable as long as it is less than the capacity of a compressor which I provide for maintaining the desired pressure-differential between the two cooling-systems.

An illustrative form of embodiment of my invention, illustrating the general principles thereof, is shown in the accompanying drawings, wherein Figure 1 is a much simplified and somewhat diagrammatic longitudinal sectional view, not to scale, showing a large turbine generator embodying my invention; Fig. 2 is a detailed view, on a somewhat larger scale, of the portion of Fig. 1 which is indicated at 2; Fig. 3 is a cross-sectional detail of a portion of the rotor member, on the section-plane indicated at III—III in Fig. 1; and Fig. 4 is a cross-sectional detail of one of the stator-winding coils, on the section-plane which is indicated at IV—IV in Fig. 1.

My illustrated machine comprises a stator member 5 and a rotor member 6, with an air gap 7 between them. The machine has a substantially gas-tight casing or housing 8 which encloses the stator and rotor members 5 and 6, said housing 8 comprising a cylindrical or other peripheral housing-wall 8A, and two outer end-walls 8B and 8C. The two end-walls 8B and 8C of the housing carry bearings 9 in which the rotor member 6 is journalled; and when the rotor-shaft extends outside of the housing 8, these bearings 9 are associated with gland-seals 10 which maintain the integrity of the gas-tightness of the housing, at the place where the shaft extends therethrough, as is well known.

The stator member 5 comprises a stator-core 12, having a bore 13, conductor-receiving core-slots 14 in said bore, and radial ventilating spaces or other core-ventilating passages 15 in said stator-core. The stator-member 5 also has an alternating-current stator-winding 16, usually a high-voltage polyphase winding, consisting of a plurality of coils 17 having ground-insulated coil-side portions 18 lying in the respective stator-slots 14. At least the coil-side portions 18 of the stator winding comprise stacks of lightly insulated conductors 19 which divide the current of that coil-side between them, and further comprise means for providing open-ended stator-winding innercooling-ducts or passages 20 which are in good heat-exchanging relation to said lightly insulated stator-winding conductors 19.

Preferably, as shown in Fig. 1, the ground insulation 21 and the ducts 20 extend from end to end throughout the entire length of each half-coil of the stator-winding 16, the open ends of the ducts 20 being exposed at the respective ends of the stator-winding 16. Preferably, as shown in Fig. 4, the stator-winding innercooling-ducts 20 are provided by means of a stack of ducts or tubes, made of metal or other conductive material having sufficient electrical resistance to reduce the eddy-current losses to within tolerable limits, as shown in a copending application of R. A. Baudry and P. R. Heller, Serial No. 248,852, filed September 28, 1951; except that I make my present ducts 20 a trifle smaller in external size, and considerably thicker in wall-thickness, so that the ducts can withstand the rather considerable gas-pressure which may be used in my present invention, as will be subsequently described. I am not limited, however, to these details, in the broader aspects of my present invention.

The rotor member 6 comprises a cylindrical rotor core 23 having conductor-receiving rotor-slots 24 therein. Said rotor member also carries a direct-current field-winding 25, having coil-side portions lying in the respective rotor-slots, and having means for providing open-ended innercooling-ducts 27 which extend intact throughout the length of the rotor, in good heat-exchanging relation to the field-winding conductors. The ducts 27 thus constitute rotor-winding innercooling-ducts in which the flow of cooling-gas is in, at one end of the rotor, and out at the other end.

Any suitable means may be provided for maintaining the gas-tightness of the rotor innercooling ducts 27, between the two open ends thereof. In the particular form of invention which is illustrated in Fig. 3, the ducts 27 are provided by a rotor-winding construction in which channeled rotor-conductors 30 are disposed in pairs, so that each pair of conductors constitutes, in effect, a single conductor having a ventilating-hole through it, in the manner which is shown, in principle, in my Patent 2,221,-567, of November 12, 1940. Such ducts are not sufficiently gas-tight to prevent the escape or leakage of gas which is at any considerable pressure, and so, as shown in Figs. 2 and 3, the damper-windings 32, which are commonly disposed immediately under the slot-closing wedge 33 of each rotor-slot 24, are preferably provided laterally with special temperature-resistant rubber seals 34; and I also preferably provide circular rubber end-seals 35 (Fig. 2) at the ends of the damper-windings 32, for making a pressure-withstanding gas-tight joint with the retaining ring 36 at each end of the rotor member. As a further part of the means for insuring the gas-tightness of the rotor-ducts 27, each retaining ring 36, as shown in Fig. 1, is provided with an end plate 37 which is provided with an O-ring 38 or other means for providing a gas-tight joint with the shaft-ends 40 of the rotor member.

As shown in Fig. 1, the shaft-ends 40 of the rotor member are, or constitute a portion of, two cylindrical-surface seal-portions which immediately adjoin each end of the field-winding 25. These shaft-ends or seal-portions 40 are provided, underneath the same, with underpassages 42 which serve as extensions of the field-winding cooling-ducts 27.

Also, as shown in Fig. 1, the closure or housing 8 is provided, in addition to the peripheral housing-wall 8A and the two outer end-walls 8B and 8C, with two spaced inner end-walls 43A and 43B, carrying inner gland-seals 44 which bear on the respective cylindrical-surfaced seal-portions or shaft-ends 40 of the rotor member 6. These two inner gland-seals 44 are in addition to the usual outer gland-seals 10 which constitute parts of the gas-tight housing 8. Thus, the housing-space inside of the two inner gland-seals 44 constitutes a sealed-off gas-space within which the rotor member 6 rotates, so that the windage losses of the rotor can be controlled by using a low gaseous pressure inside of the two inner gland-seals 44, while using a considerably higher gaseous pressure outside of said two inner gland-seals 44, that is, in the two end-spaces 46A and 46B between the inner and outer end-walls at the respective ends of the housing.

As shown in Fig. 1, the housing 8 is provided with peripherally disposed tubes 47, or other communicating-means, disposed near, and preferably inside of, the peripheral housing-wall 8A, for joining the two end-spaces 46A and 46B.

In the embodiment of my invention which is shown in Fig. 1, the ends of the stator-winding inner-cooling ducts or tubes 20, at each end of each stator-coil 17, terminate in an insulating header 48, which is joined, by flexible insulating tubes 49, to the respective high-pressure end-spaces or chambers 46A or 46B, at the respective ends of the generator. In the broader aspects of my invention, this illustration is intended to be representative of any end-winding-space communicating-means, disposed in each end-winding space 50 between the stator-core 12 and the respective inner end-walls 43A and 43B of the housing 8, for joining the respective ends of the stator-winding cooling-ducts 20 to the respective end-spaces 46A and 46B between the inner end-wall 43A or 43B, as the case may be, and the outer end-wall 8B or 8C, as the case may be, at the respective ends of the housing.

I provide a relatively high-pressure filling of hydrogen, or other gas having a molecular weight lower than 14, in the two end-spaces 46A and 46B, in the peripheral communicating-means 47, in the two end-winding-space communicating-means 48—49 at the respective ends of the machine, in the stator-winding cooling-ducts 20, and in the field-winding cooling-ducts 27, including their extensions 42.

I also provide a high-pressure ventilating system, which includes a centrifugal rotor-mounted blower 52, or other suitable type of blower, which is disposed in at least one of the end-spaces, such as the left-hand end-space 46A between the inner end-wall 43A and the outer end-wall 8B. Said high-pressure ventilating system also includes, in said left-hand end-space 46A, a cooler 53 for said high-pressure gas, and a partition 54 which is disposed close to the inner end-wall 43A of said left-hand end-space 46A. The partition 54 is so disposed as to separate or divide the left-hand end-space 46A into two spaces 55 and 56. The first space 55 is shown as a blower-intake space, which communicates with the flexible insulating tubes 49 of the stator-winding innercooling means, and also with the field-winding cooling-duct extensions or underpasses 42 at that end of the machine. The second space 56 contains the blower 52 and the cooler 53 at that end-space 46A. This second space 56 is also in communication with that end of the peripheral communicating-means 47.

I thus provide a high-pressure ventilating system, using high-pressure gas, which is cooled and blown from left to right, through the peripheral tube or tubes 47, to the right-hand end-space 46B, which is in communication with the right-hand ends of both the innercooling stator-winding ducts 20 and the innercooling rotor-winding ducts 27. From the left-hand ends of these innercooling ducts, the high-pressure gas returns to the first space 55 of the left-hand end-space 46A, whence it is recirculated, by the blower 52, in the paths just described. The hydrogen or other gas in this high-pressure ventilating system is preferably maintained at a high pressure, which may be in the range from 100 p. s. i. g. (pounds per square inch gauge) to several hundred p. s. i. g., depending upon the pressure-resistant strength of the innercooling ducts 20 and 27, and associated parts. By using a high pressure in this separate gas-tight high-pressure cooling or ventilating system, I can withdraw heat from the stator and rotor winding-conductors at rates which are limited only by the pressure-strength of the duct-systems, without involving a high energy-consuming gas-pressure-differential in the blower 52, that is, using relatively low-gas-velocities in the innercooling ducts 20 and 27.

I provide a relatively-low-pressure filling of the same gas, which is preferably hydrogen, in the remaining space which is enclosed by the housing 8, including the air gap 7 and the stator-core ventilating-passages 15. I also provide a low-pressure ventilation-system for moving this low-pressure gas, including a rotor-mounted fan 58, which is disposed at at least one end, say at the right-hand end of the field-winding 25, as shown in Fig. 1. As a part of this low-pressure ventilating system, I also provide a partition 59 which is disposed inside of, and spaced from, the right-hand inner end-wall 43B. A cooler 60, for the low-pressure gas, is disposed in the space between this partition 59 and the right-hand inner end-wall 43B. The partition 59 takes the low-pressure gas which is delivered by the fan 58, and passes it first through the cooler 60, and then into an annular peripheral space 61 which is provided between the peripheral housing-wall 8A and an inner tubular wall 62. This inner tubular wall 62 is perforated, at 63, to deliver the low-pressure gas to the radial ventilating spaces 15 of the stator-core 12, and also to the two end-winding spaces 50. From the stator-core ventilating spaces 15, and from the end-winding spaces 50, the low-pressure cooling-gas is delivered to the air gap 7 and to the intake side of the fan 58, whence the gas is continuously recirculated, in the paths just mentioned.

It is well known that in machines which use a direct cooling or innercooling system for the stator and rotor windings, there is only a relatively small amount of heat which is generated in the stator and rotor cores and in the windage losses due to the rotation of the rotor member 6. Consequently, I can use the low-pressure gas at a low pressure, of the order of 5 to 30 p. s. i. g., more or less, so as to keep the windage losses low, while at the same time carrying away the relatively small heat-losses which are encountered in this low-pressure ventilating system, without the use of energy-consuming high gas-velocities in the low-pressure cooling-passages, or a high fan-pressure differential in the fan 58.

My present invention has the very great advantage of permitting a choice of the most economical cooling-fluid conditions for innercooling the stator-winding 16, or for innercooling both said stator-winding and the rotor or field-winding 25, without using a high-density gas in the part of the housing in which the rotor member 5 rotates, that is, without involving high windage-losses which reduce the efficiency of the machine. By choosing a winding-cooling gas having a high pressure, it is possible to extract the heat-losses from the winding-conductors without requiring high gas-velocities or large gas-duct spaces, thus economizing on the power which is required to drive the gas through the innercooling ducts, and also reducing the over-all size of the machine. By using the same kind of gas in the high-pressure system as in the low-pressure system, I achieve a very great advantage, which has never been achieved before, namely that a small amount of leakage from the high-pressure system to the low-pressure system can be tolerated, without any other disadvantage, other than the requirement of some compressor-means for pumping the gas back from the low-pressure system to the high-pressure system.

Thus, in Fig. 1, I show such a compressor-means in the form of a pump P which is connected so as to draw gas from the low-pressure system and supply it to the high-pressure system. It may be desirable, as indicated, to automatically control this pumping connection, by any convenient means, so as to maintain the desired gaseous pressure in the high-pressure system, or, as indicated in Fig. 1, so as to maintain a predetermined pressure-difference between the two ventilating systems, as is diagrammatically indicated by the pressure-regulator 64.

The gaseous pressure in the low-pressure system may be maintained, either manually or automatically, by the proper manipulation of a hydrogen-supply, diagrammatically indicated at H2, which is used to supply the replacement-gas which is needed to make up for gas-leakage out of the housing 8, in a known manner.

I claim as my invention:

1. A synchronous dynamo-electric machine having a stator member, a rotor member, a substantially gas-tight housing within which said rotor member rotates, said housing having a filling of a gas having a molecular weight lower than 14; said stator member comprising a stator-core having a bore and conductor-receiving core-slots in said bore, and an alternating-current stator-winding consisting of a plurality of coils having ground-insulated coil-side portions lying in the respective conductor-receiving slots of the stator-core; at least said coil-side portions of the stator-winding comprising stacks of lightly insulated conductors dividing the current between them, and further comprising means for providing open-ended stator-winding cooling-ducts in good heat-exchanging relation to said lightly insulated stator-winding conductors; said rotor member comprising a cylindrical rotor-core having conductor-receiving rotor-slots therein, and a direct-current field-winding having coil-side portions lying in the respective rotor-slots; a housing-gas cooling-system including means for recirculating and cooling the gas which fills said housing; a separate gas-tight cooling-system which is separate, and substantially hermetically sealed, from the gas-filled space within said housing, said separate gas-tight cooling-system being filled with substantially the same kind of gas as said housing, and comprising also a cooler and a means for recirculating its gas in closed paths including its cooler and said stator-winding cooling-ducts; and a compressor-means for providing a pumping-connection from the gas which fills said housing to the gas which fills said separate cooling-system, whereby the gas in said separate cooling-system may be maintained at a higher pressure than the gas in the rest of the housing-space, and whereby any gas-leakage from said separate cooling-system into the rest of the housing-space would be substantially unobjectionable within the limits of the capacity of the compressor-means.

2. A synchronous dynamo-electric machine having stator and rotor members with an air gap between them, a substantially gas-tight housing enclosing said stator and rotor members, said housing having a filling of a gas bathing both said stator member and said rotor member, said gas having a molecular weight lower than 14; said stator member comprising a stator-core having a bore, conductor-receiving core-slots in said bore, and core-ventilating passages in said stator core, and an alternating-current stator-winding consisting of a plurality of coils having ground-insulated coil-side portions lying in the respective conductor-receiving slots of the stator-core; at least said coil-side portions of the stator-winding comprising stacks of lightly insulated conductors dividing the current between them, and further comprising means for providing open-ended stator-winding cooling-ducts in good heat-exchanging relation to said lightly insulated stator-winding conductors; said rotor member comprising a cylindrical rotor-core having conductor-receiving rotor-slots therein, and a direct-current field-winding having coil-side portions lying in the respective rotor slots, said field winding having means for providing means for providing open-ended cooling-ducts which extend intact throughout the length of the rotor, in good heat-exchanging relation to its conductors; a housing-gas cooling-system comprising a cooler and a means for recirculating the gas which fills said housing, in closed paths including its cooler, the air gap, and the core-ventilating passages of the stator core; a separate gas-tight cooling-system which is separate, and substantially hermetically sealed, from the gas-filled space within said housing, said separate gas-tight cooling-system being filled with substantially the same kind of gas as said housing, and comprising also a cooler and a means for recirculating its gas in closed paths including its cooler and the cooling-ducts of both said stator-winding and said field-winding; and a compressor-means for providing a pumping-connection from the gas which fills said housing to the gas which fills said separate cooling-system, whereby the gas in said separate cooling-system may be maintained at a higher pressure than the gas in the rest of the housing-space, and whereby any gas-leakage from said separate cooling-system into the rest of the housing-space would be substantially unobjectionable within the limits of the capacity of the compressor-means.

3. A synchronous dynamo-electric machine having stator and rotor members with an air gap between them, a substantially gas-tight housing enclosing said stator and rotor members, said stator member comprising a stator-core having a bore, conductor-receiving core-slots in said bore, and core-ventilating passages in said stator-core, and an alternating-current stator-winding consisting of a plurality of coils having ground-insulated coil-side portions lying in the respective conductor-receiving slots of the stator-core; at least said coil-side portions of the stator-winding comprising stacks of lightly insulated conductors dividing the current between them, and further comprising means for providing open-ended stator-winding cooling-ducts in good heat-exchanging relation to said lightly insulated stator-winding conductors; said rotor member comprising a cylindrical rotor-core having conductor-receiving rotor-slots therein, and a direct-current field-winding having coil-side portions lying in the respective rotor-slots, said field-winding having means for providing open-ended cooling-ducts which extend intact throughout the length of the rotor, in good heat-exchanging relation to its conductors; said rotor member carrying a cylindrical-surfaced seal-portion immediately adjoining each end of the field-winding, and having, underneath said seal-portions, extensions of the field-winding cooling-ducts; said housing having a peripheral housing-wall, two outer end-walls carrying bearings in which said rotor member is journaled, two spaced inner end-walls carrying gland-seals bearing on said cylindrical-surfaced seal-portions of the rotor member, a peripheral communicating means, disposed near said peripheral housing-wall, for joining the two end-spaces between the inner and outer end-walls at the respective ends of the housing, and an end-winding-space communicating means, disposed in each end-winding-space between the stator-core and the respective inner end-walls of the housing, for joining the respective ends of the stator-winding cooling-ducts to the respective end-spaces between the inner and outer end-walls at the respective ends of the housing; a relatively-high-pressure filling of a gas, having a molecular weight lower than 14, in said two end-spaces, in said peripheral communicating means, in said two end-winding-space communicating means, in said stator-winding cooling-ducts, and in said field-winding cooling-ducts including their extensions; a relatively-low-pressure filling of the same gas in the remaining space enclosed by said housing, including the air gap and the stator-core ventilating-passages; a high-pressure ventilating system, including a rotor-mounted blower disposed in at least one of said end-spaces, a first cooler, and a first partition, close to the inner end-wall of said end-space, for separating said end-space into a first space and a second space, said first space communicating with the end-winding-space communicating means and the field-winding cooling-duct extensions at that end of the machine, and said second space containing the blower and the cooler of that end-space, said second space being also in communication, with that end of the peripheral communicating means; and a low-pressure ventilating system, including a rotor-mounted fan disposed at at least one end of the field-winding, a second cooler, and a second partition, disposed inside of, and spaced from, the inner end-wall which is at the end of the machine as said fan which is opposite to said first cooler, for circulating the low-pressure gas from said air gap and said stator-core ventilating passages, through said fan and said second cooler, and back again in a recirculating system.

4. A synchronous dynamo-electric machine having stator and rotor members with an air gap between them, a substantially gas-tight housing enclosing said stator and rotor members, said stator member comprising a stator-core having a bore, conductor-receiving core-slots in said bore, and core-ventilating passages in said stator-core, and an alternating-current stator-winding consisting of a plurality of coils having ground-insulated coil-side portions lying in the respective conductor-receiving slots of the stator-core; at least said coil-side portions of the stator-winding comprising stacks of lightly insulated conductors dividing the current between them, and further comprising means for providing open-ended stator-winding cooling-ducts in good heat-exchanging relation to said lightly insulated stator-winding conductors; said rotor member comprising a cylindrical rotor-core having conductor-receiving rotor-slots therein, and a direct-current field-winding having coil-side portions lying in the respective rotor-slots, said field-winding having means for providing open-ended cooling-ducts which extend intact throughout the length of the rotor, in good heat-exchanging relation to its conductors; said rotor member carrying a cylindrical-surfaced seal-portion immediately adjoining each end of the field-winding, and having, underneath said seal-portions, extensions of the field-winding cooling-ducts; said housing having a peripheral housing-wall, two outer end-walls carrying bearings in which said rotor member is journaled, two spaced inner end-walls carrying gland-seals bearing on said cylindrical-surfaced seal-portions of the rotor member, a peripheral communicating means, disposed near said peripheral housing-wall, for joining the two end-spaces between the inner and outer end-walls at the respective ends of the housing, and an end-winding-space communicating means, disposed in each end-winding space between the stator-core and the respective inner end-walls of the housing, for joining the respective ends of the stator-winding cooling-ducts to the respective end-spaces between the inner and outer end-walls at the respective ends of the housing; a relatively-high-pressure filling of a gas, having a molecular weight lower than 14, in said two end-spaces, in said peripheral communicating means, in said two end-winding-space communicating means, in said stator-winding cooling-ducts, and in said field-winding cooling-ducts including their extensions; a relatively-low-pressure filling of the same gas in the remaining space enclosed by said housing, including the air gap and the stator-core ventilating-passages; a high-pressure ventilating system, including a rotor-mounted blower disposed in at least one of said end-spaces, a first cooler, and a first partition, close to the inner end-wall of said end-space, for separating said end-space into a first space and a second space, said first space communicating with the end-winding-space communicating means and the field-winding cooling-duct extensions at that end of the machine, and said second space containing the blower and the cooler of that end-space, said second space being also in communication, with that end of the peripheral communicating means; a low-pressure ventilating system, including a rotor-mounted fan disposed at at least one end of the field-winding, a second cooler, and a second partition, disposed inside of, and spaced from, the inner end-wall which is at the end of the machine as said fan which is opposite to said first cooler, for circulating the low-pressure gas from said air gap and said stator-core ventilating passages, through said fan and said second cooler, and back again in a recirculating system; and a compressor-means for providing a pumping-connection from the low-pressure ventilating system to the high-pressure ventilating-system, whereby the gas in the high-pressure ventilating-system may be maintained at a higher pressure than the gas in the low-pressure ventilating-system, and whereby any leakage from the high-pressure ventilating system into the low-pressure ventilating system would be substantially unobjectionable within the limits of the capacity of the compressor-means.

5. A dynamoelectric machine having a stator member, a rotor member, a substantially gas-tight housing enclosing the stator and rotor members, said housing being filled with a coolant gas, the stator member including a slotted stator core and stator windings comprising conductors disposed in the slots of the core and insulated therefrom and duct means extending through the slots for circulation of gas in good thermal relation to the conductors, said rotor member including a core carrying field windings and having duct means extending therethrough for circulation of gas in good thermal relation to the field windings, means for circulating said coolant gas within the housing, and separate means for circulating gas of the same kind at a higher pressure in a closed path substantially sealed from the space within the housing, said closed path including the duct means of the stator member and the duct means of the rotor member.

6. A dynamoelectric machine having a stator member, a rotor member, a substantially gas-tight housing enclosing the stator and rotor members, said housing being filled with a coolant gas, the stator member including a slotted stator core and stator windings comprising conductors disposed in the slots of the core and insulated therefrom and duct means extending through the slots for circulation of gas in good thermal relation to the conductors, said rotor member including a slotted rotor core, field windings comprising conductors disposed in the slots of the rotor core, said field windings providing duct means extending through the rotor slots for circulation of gas in good thermal relation to the field winding conductors, the rotor member also including duct means extending towards the ends of the rotor member and communicating with the duct means extending through the rotor slots, means for circulating said coolant gas within the housing, and separate means for circulating gas of the same kind at a higher pressure in a closed path substantially sealed from the space within the housing, said closed path including the duct means of the stator member and the duct means of the rotor member.

7. A dynamoelectric machine having a stator member, a rotor member, a substantially gas-tight housing enclosing the stator and rotor members, said housing being filled with a coolant gas, the stator member including a slotted stator core and stator windings comprising conductors disposed in the slots of the core and insulated therefrom and duct means extending through the slots for circulation of gas in good thermal relation to the conductors, said rotor member including a core carrying field windings and having duct means extending therethrough for circulation of gas in good thermal relation to the field windings, means for circulating said coolant gas within the housing, separate means for circulating gas of the same kind at a higher pressure in a closed path substantially sealed from the space within the housing, said closed path including the duct means of the stator member and the duct means of the rotor member, and pumping means for pumping gas from the space within the housing into said closed path.

8. A dynamoelectric machine having a stator member, a rotor member, a substantially gas-tight housing enclosing the stator and rotor members, said housing being filled with a coolant gas, the stator member including a slotted stator core and stator windings comprising conductors disposed in the slots of the core and insulated therefrom and duct means extending through the slots for circulation of gas in good thermal relation to the conductors, said rotor member including a slotted rotor core, field windings comprising conductors disposed in the slots of the rotor core, said field windings providing duct means extending through the rotor slots for circulation of gas in good thermal relation to the field winding conductors, the rotor member also including duct means extending towards the ends of the rotor member and communicating with the duct means extending through the rotor slots, means for circulating said coolant gas within the housing, and separate means for circulating gas of the same kind at a higher pressure in a closed path substantially sealed from the space within the housing, said closed path including the duct means of the stator member and the duct means of the rotor member, and means for pumping gas from the space within the housing into said closed path to maintain a predetermined pressure difference between the gas in the housing and the gas in the closed path.

References Cited in the file of this patent

UNITED STATES PATENTS

| | | |
|---|---|---|
| 2,722,616 | Moses | Nov. 1, 1955 |
| 2,763,794 | Baudry | Sept. 18, 1956 |